(No Model.)
P. W. MACKENZIE.
APPARATUS FOR PRODUCING ILLUMINATING GAS.
No. 246,966.  Patented Sept. 13, 1881.
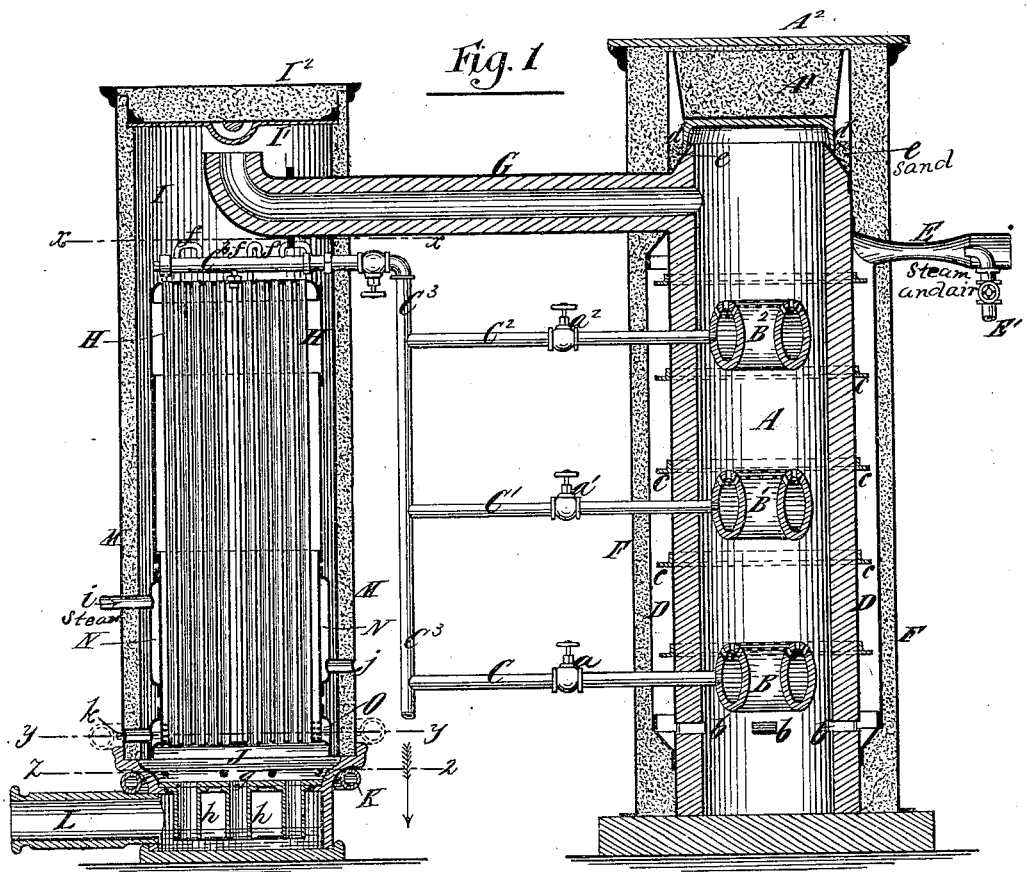
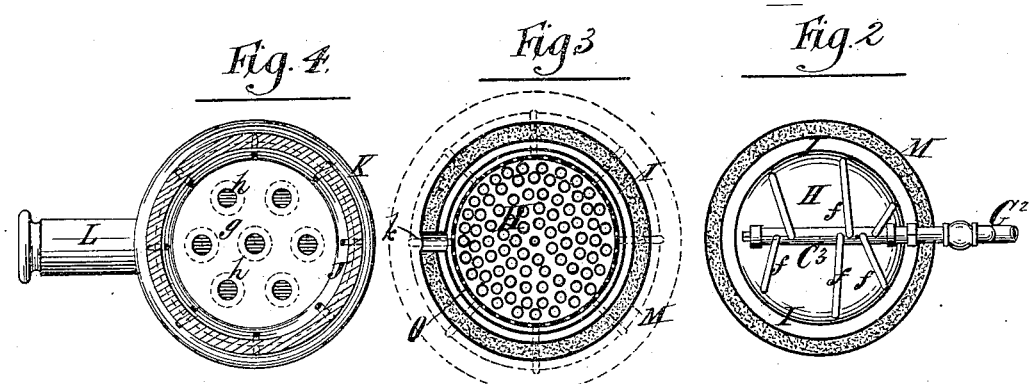
Witnesses:—
Louis M. Whitehead
Fredk Haynes
Inventor:—
P. W. Mackenzie
by his Attorneys
Brown & Brown

UNITED STATES PATENT OFFICE.

PHILIP W. MACKENZIE, OF BLAUVELTVILLE, ASSIGNOR TO THE MACKENZIE & SAYRE MANUFACTURING COMPANY, OF NEW YORK, N. Y.

APPARATUS FOR PRODUCING ILLUMINATING-GAS.

SPECIFICATION forming part of Letters Patent No. 246,966, dated September 13, 1881.

Application filed October 5, 1880. (No model.)

*To all whom it may concern:*

Be it known that I, PHILIP W. MACKENZIE, of Blauveltville, in the county of Rockland and State of New York, have invented certain new and useful Improvements in Apparatus for Producing Illuminating-Gas, of which the following is a specification.

My invention relates to that class of gas apparatus for producing a rich gas for illuminating and other purposes by first generating in a suitable furnace a lean gas—such as a mixture of carbonic oxide and hydrogen—and afterward enriching such gas by the addition to it, while hot, of hydrocarbon vapors, which by the heat of the gas are caused to be converted into and incorporated with it to make a perfect permanent gas.

The object of my invention is to provide a simple form of apparatus in which hydrocarbons in a state of gas or vapor may be employed as a fuel instead of solid fuel—such as coke, coal, or charcoal—for producing, with oxygen or air and steam, by combustion a mixture of carbonic oxide and hydrogen, and in which said mixture has added to it and incorporated with it in the form of an enriched and perfected gas the necessary quantity of hydrocarbon.

The invention consists in the combination, in an apparatus for generating gas, of an upright chamber or furnace, two or more gas burners or distributers, preferably of hollow annular form, arranged within the furnace one above another, pipes for supplying hydrocarbon vapors or gas to said burners or distributers, and pipes or tuyeres for supplying air and steam to the generator below the lowest burner or distributer. The supply of hydrocarbon vapor or enriching gas may be taken from a converter in which hydrocarbon liquid is vaporized by the heat of the perfected permanent gas.

In the accompanying drawings, Figure 1 represents a central vertical section of a complete apparatus embodying my improvements. Fig. 2 is a horizontal section upon the dotted line $x\ x$, Fig. 1. Fig. 3 is a similar section on the dotted line $y\ y$, Fig. 1. Fig. 4 is a similar section upon the dotted line $z\ z$, Fig. 1.

Similar letters of reference designate corresponding parts in all the figures.

A designates an upright chamber, here represented as cylindrical in form and lined with fire-brick or other refractory material. Within this chamber, and arranged one above another, are perforated gas burners or distributers, here represented as three in number, B B' B², and preferably of annular form, as shown. These burners or distributers are supplied with hydrocarbon vapors or enriching-gas by means of pipes C C' C², provided with suitable valves, $a\ a'\ a^2$, for regulating the passage of vapors through them.

In order to conveniently heat the air or oxygen and steam necessary to produce combustion, I surround the chamber with a jacket, D, which is supplied with steam and oxygen or air by an air-nozzle, E, and a steam-jet, E', forming an injector, and said jacket communicates with the generator below the lowest burner, B, by means of pipes or tuyeres $b$.

Within the jacket, and attached to the exterior of the generator proper, are a series of annular rings, C, by which the steam and oxygen or air are retarded in their passage downward and retained for a much longer time in the jacket, so as to become more thoroughly heated.

The generator is surrounded by an outer casing or jacket, F, within which is a covering of non-conducting material, such as mineral wool or asbestus.

A' designates a cup-shaped cover, with which the generator is provided, and which is filled with non-conducting material. This cover is provided with a downwardly-projecting rim, $d$, which enters a groove, $e$, in the generator, which is filled with sand. The joint thus formed prevents the escape of gas, and the generator is finally closed by a seal-plate, A², secured to the top thereof and luted tight.

G designates a pipe through which the perfected permanent gas is discharged for further treatment.

In the operation of my apparatus hydrocarbon in a state of gas or vapor is admitted to the lower perforated burner, B, and a quantity of steam and air necessary to support combustion is forced into the jacket D, and thence, passing downward, enters the generator through the pipes or tuyeres below the burner B, and mixing with the hydrocarbon vapors produces a combustible mixture, which, upon being ignited, is consumed, evolving carbonic oxide and hydrogen, and heating the distributer B'. If, now, the hydrocarbon vapor in proper quantity be supplied to the distributer B' it is heated to such a degree that decomposition or destructive distillation takes place, and the atoms of hydrocarbon, uniting with the mixture of carbonic oxide and hydrogen, convert it into a permanent or perfected illuminating-gas. If a very rich gas be desired, a still further quantity of hydrocarbon vapor is introduced into the upper distributer, B², and is by the heat decomposed and combined with the gas to make a permanent or perfected gas of great richness, which passes off through the pipe G.

It will be observed that the purpose of making the burners or distributers of annular form is so as to expose the greatest amount of heating-surface in each distributer to effect the more rapid and thorough heating of the hydrocarbon vapors.

The hydrocarbon vapor for use in the generator may be derived from any convenient source; but the source which I have here represented is an evaporator and converter of novel construction, which forms the subject of another application for a patent. Referring to this evaporator and converter, H represents the evaporator and converter proper, consisting of a metallic shell, filled with tubes extending from end to end thereof. From the upper part of this evaporator and converter several branches, $f$, communicate with a common pipe or collector, $C^3$, which supplies hydrocarbon vapor to the pipes C C' C².

The evaporator and converter is arranged within a chamber, I, into the upper part of which the pipe G extends, and which is slightly larger than the evaporator and converter itself, so as to leave an annular space, down which the permanent or perfected gas may pass to the base J, as well as through the tubes of the evaporator and converter, thus effecting the rapid vaporization and heating of the vapors to a high temperature by the heat of the permanent or perfected gas.

The base J is divided by a horizontal plate, $g$, and around the base is a pipe, K, which is provided with numbers of radial outlets for showering water into the base above said plate and partially washing it. From the plate $g$ a number of pipes, $h$, extend downward below the level of water in the lower compartment of the base, and through these seal-pipes the gas passes to the hydraulic main L, and thence away for further treatment.

In order to prevent loss of heat by radiation the evaporator and converter is surrounded by a covering of non-conducting material and a casing or jacket, M, and the evaporator and converter is closed at the top by a cover, I', and a seal-plate, I², carefully luted to prevent the escape of gas.

The evaporator and converter is provided with a jacket, N, provided with an inlet-pipe, $i$, and an outlet-pipe, $j$, and through which steam or hot air may be circulated in order to vaporize the hydrocarbon liquid in starting the apparatus and until the heat of the permanent or perfected gas is sufficient for that purpose, when the steam or hot air may be shut off.

Near its bottom the evaporator or converter may be provided with a second jacket, O, provided with an inlet-pipe, $k$, and communicating with the interior of the evaporator and converter by means of numerous perforations, as shown in Fig. 3. This jacket provides for introducing hydrocarbon liquid in the desired quantities around the entire circumference of the evaporator and converter.

The process of making gas herein described, together with the heating-jacket, which surrounds the upright chamber or furnace of the generator, and the novel features of construction, form no part of this invention, and are not claimed herein, but are the subjects of other applications for Letters Patent.

What I claim as my invention, and desire to secure by Letters Patent, is—

1. The combination, in an apparatus for generating gas, of an upright chamber or furnace, two or more hollow perforated gas burners or distributers arranged therein one above another, pipes for supplying hydrocarbon vapors to said burners or distributers, and pipes or tuyeres for supplying air and steam to the said chamber or furnace below the lowest burner or distributer, substantially as and for the purpose specified.

2. The combination, in an apparatus for generating gas, of an upright chamber or furnace, two or more hollow perforated gas burners or distributers of annular form arranged therein one above another, pipes for supplying hydrocarbon vapors to said burners or distributers, and pipes or tuyeres for supplying air or oxygen and steam to the said chamber or furnace below the lowest burner or distributer, substantially as and for the purpose specified.

3. The combination, in a gas apparatus, of an upright chamber or furnace, two or more hollow perforated burners or distributers arranged therein one above another, an evaporator and converter for hydrocarbon liquid, through which the gas from the furnace or generator passes, pipes leading from said evaporator and converter to said burners or distributers, and pipes or tuyeres for supplying steam and air to the said chamber or furnace below the lowest burner or distributer, substantially as and for the purpose specified.

P. W. MACKENZIE.

Witnesses:
HENRY T. BROWN,
T. J. KEANE.